June 4, 1968  W. C. BOOHER  3,386,640
SHEARING AND WELDING APPARATUS
Filed Aug. 25, 1966  9 Sheets-Sheet 1

INVENTOR.
WALTER C. BOOHER
BY
ATTORNEY

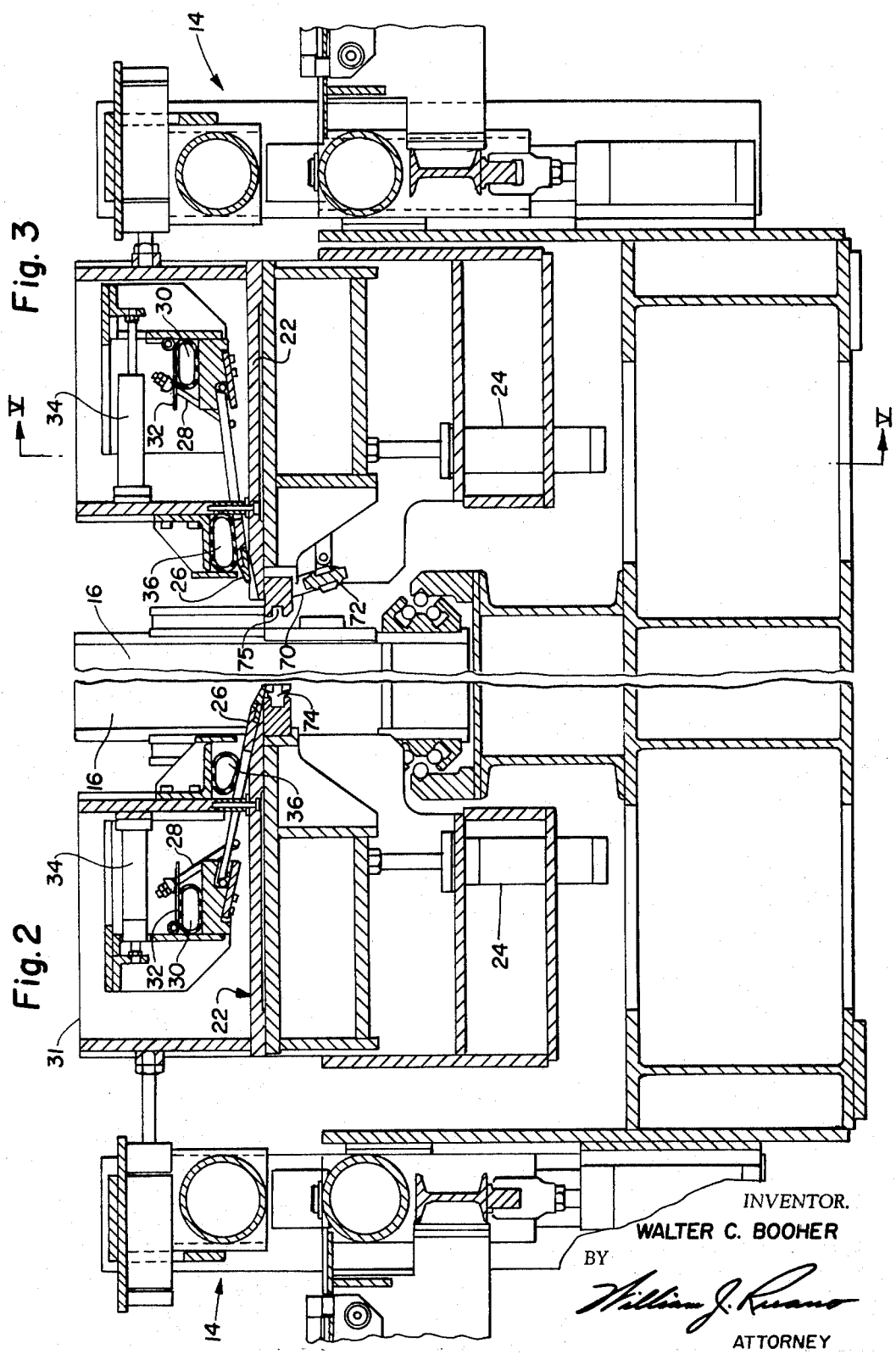

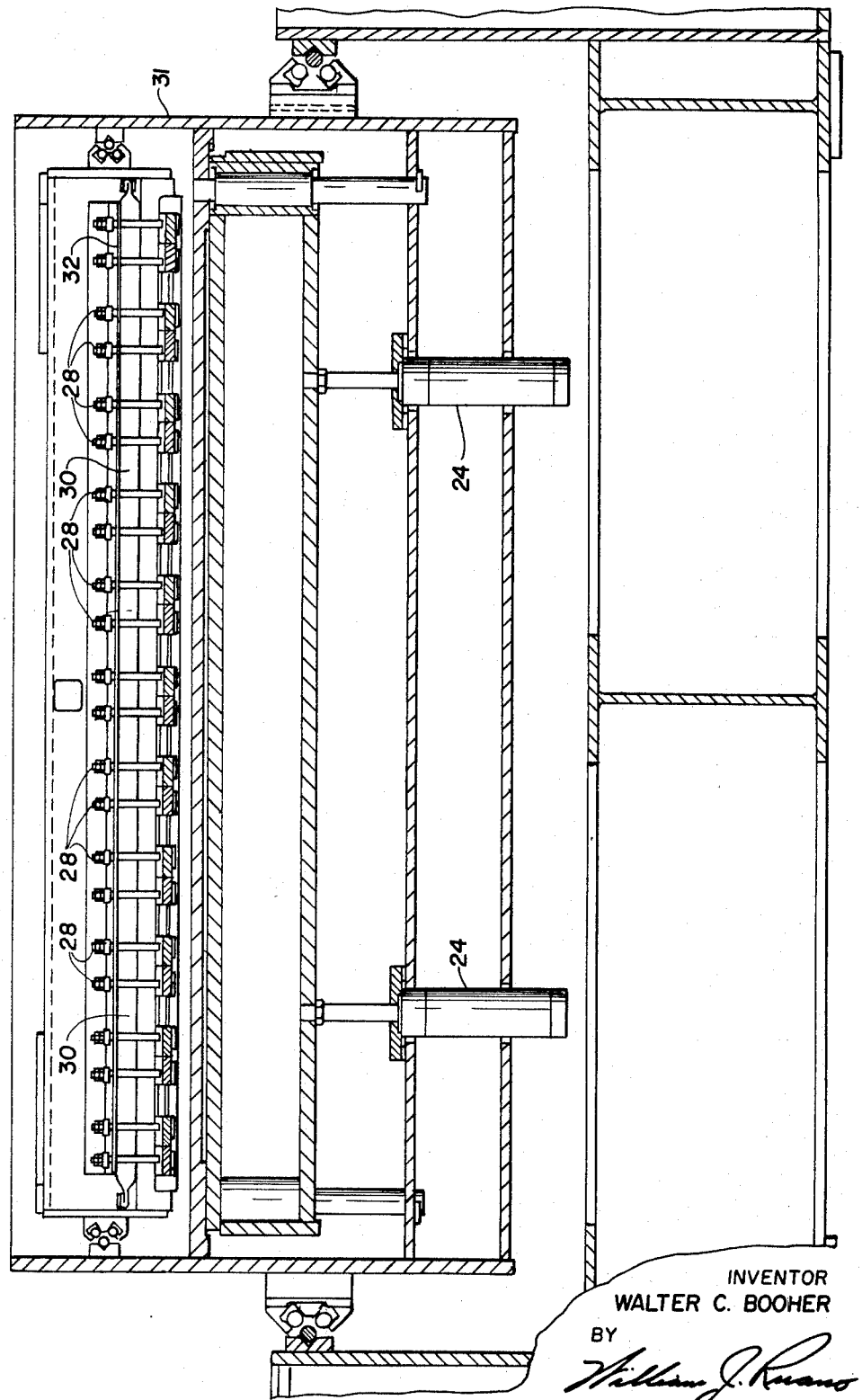

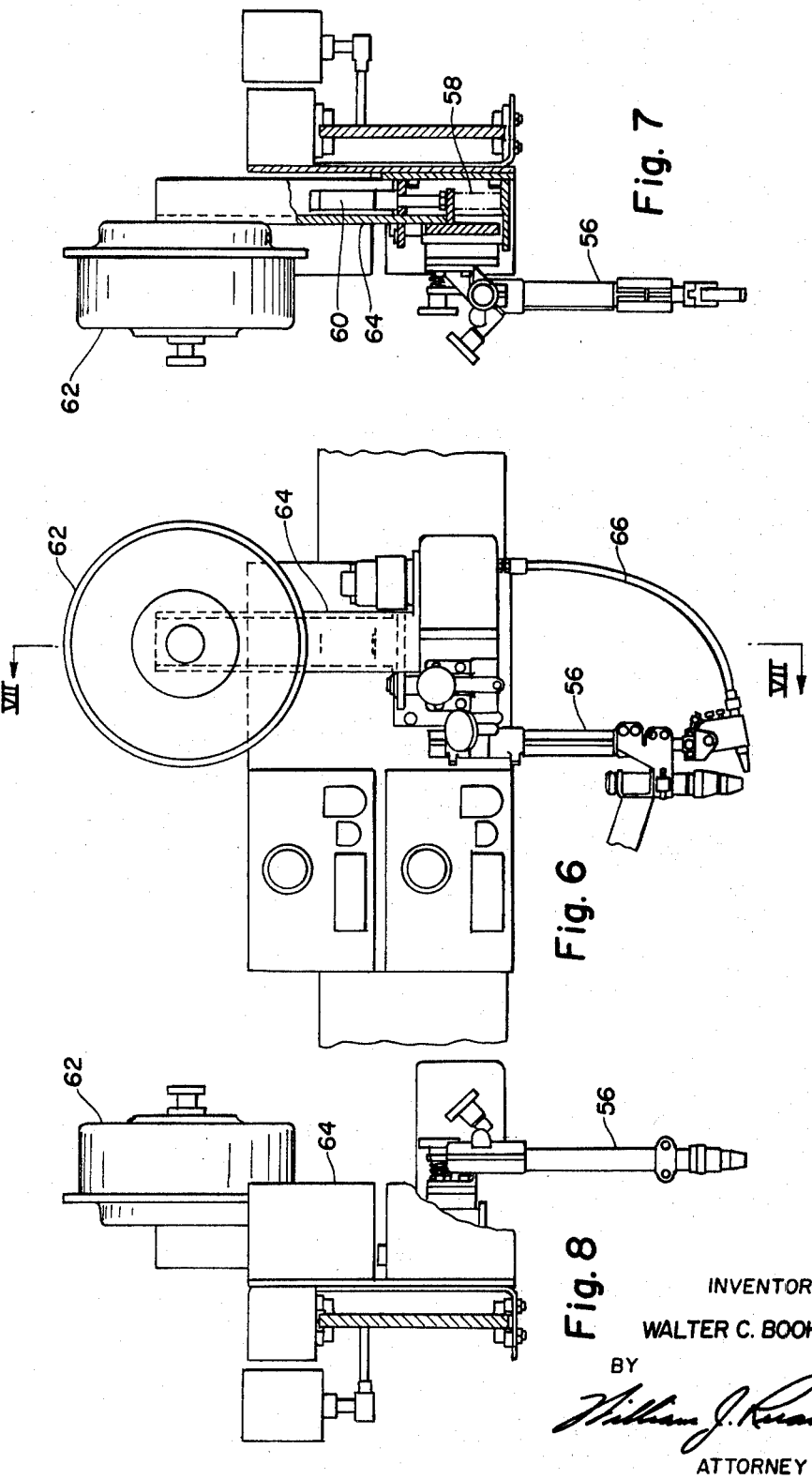

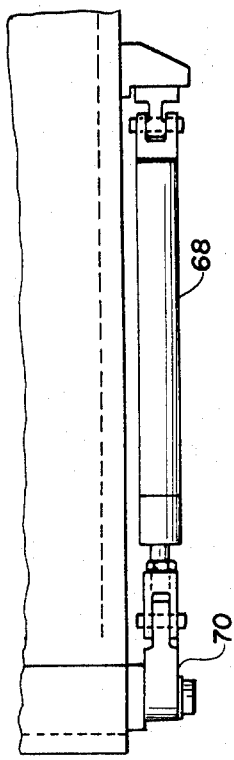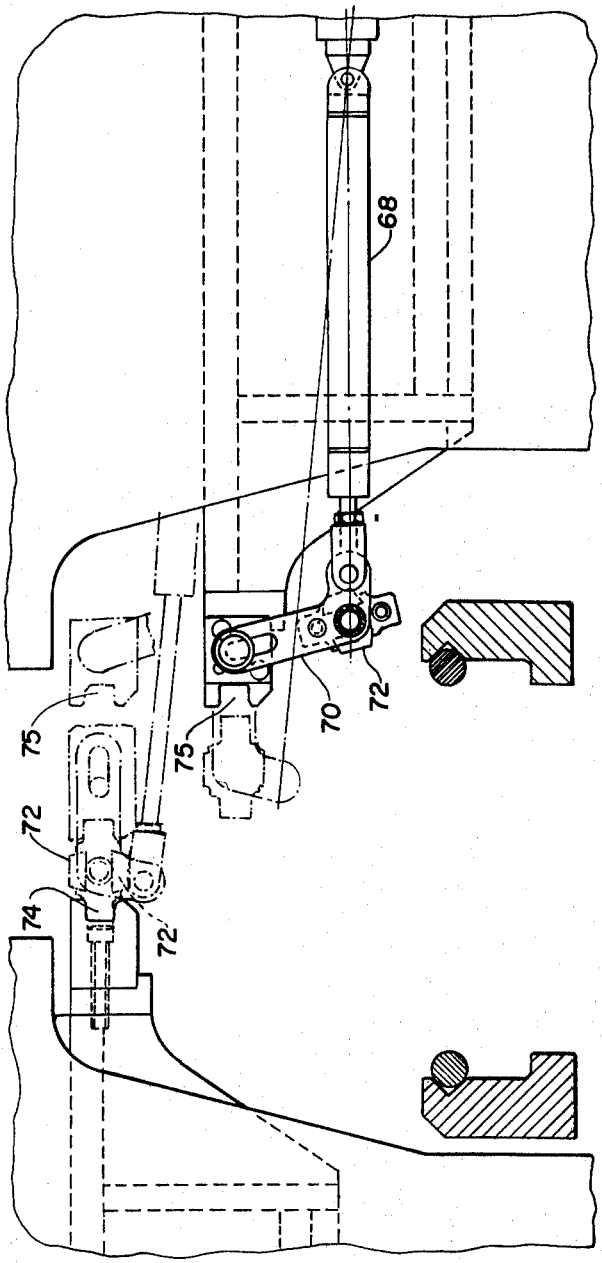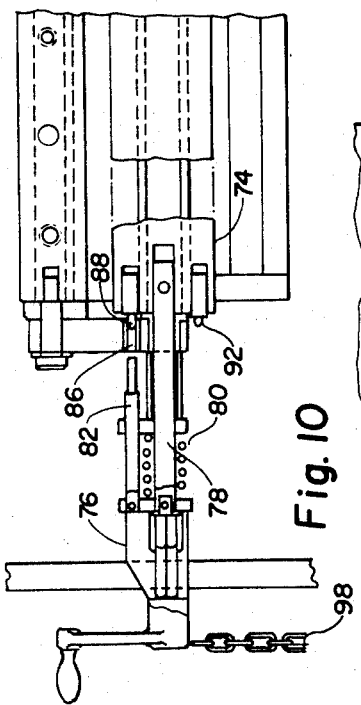

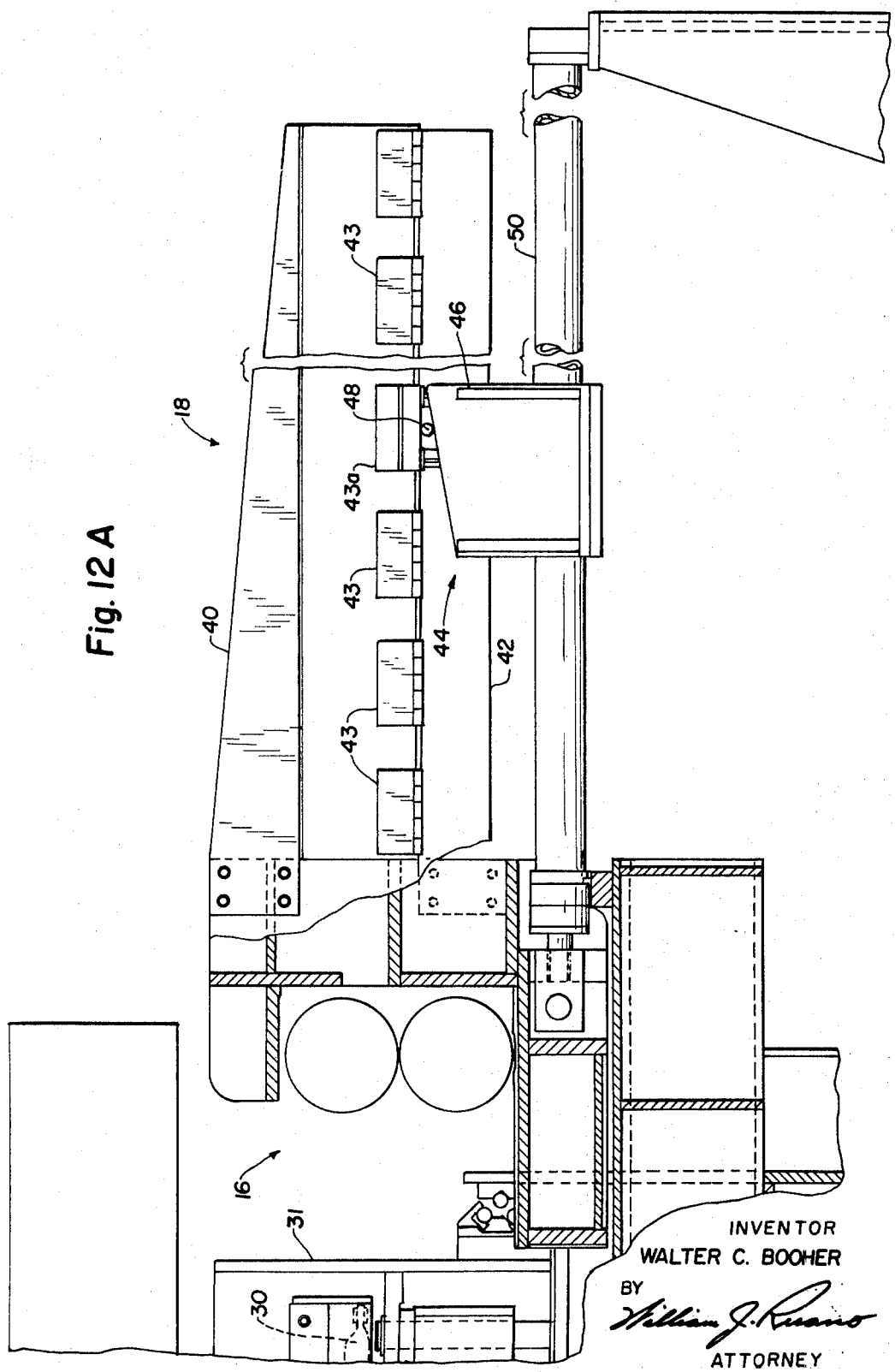

June 4, 1968 W. C. BOOHER 3,386,640
SHEARING AND WELDING APPARATUS
Filed Aug. 25, 1966 9 Sheets-Sheet 7
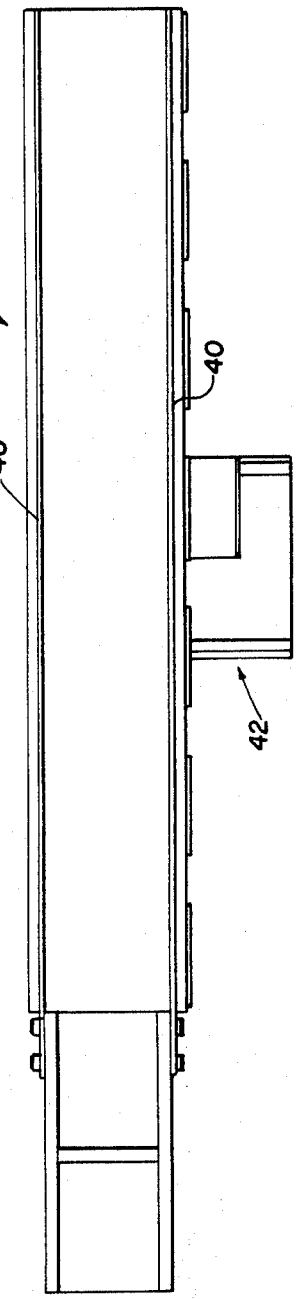
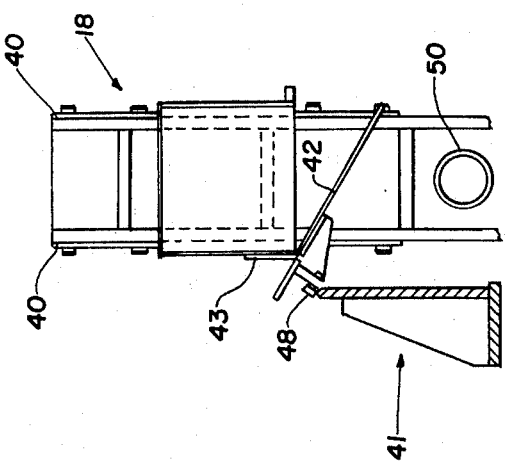
INVENTOR
WALTER C. BOOHER
BY
ATTORNEY

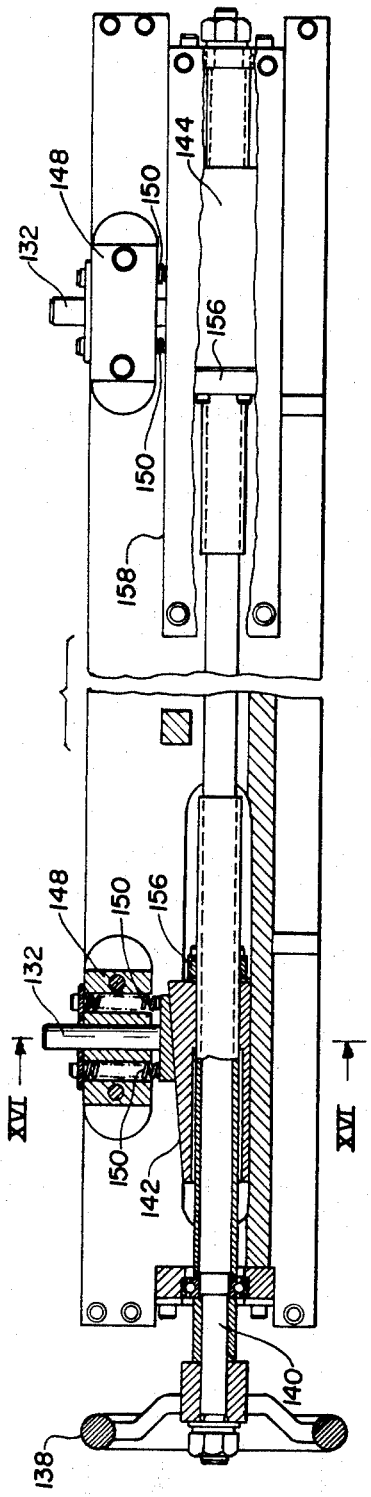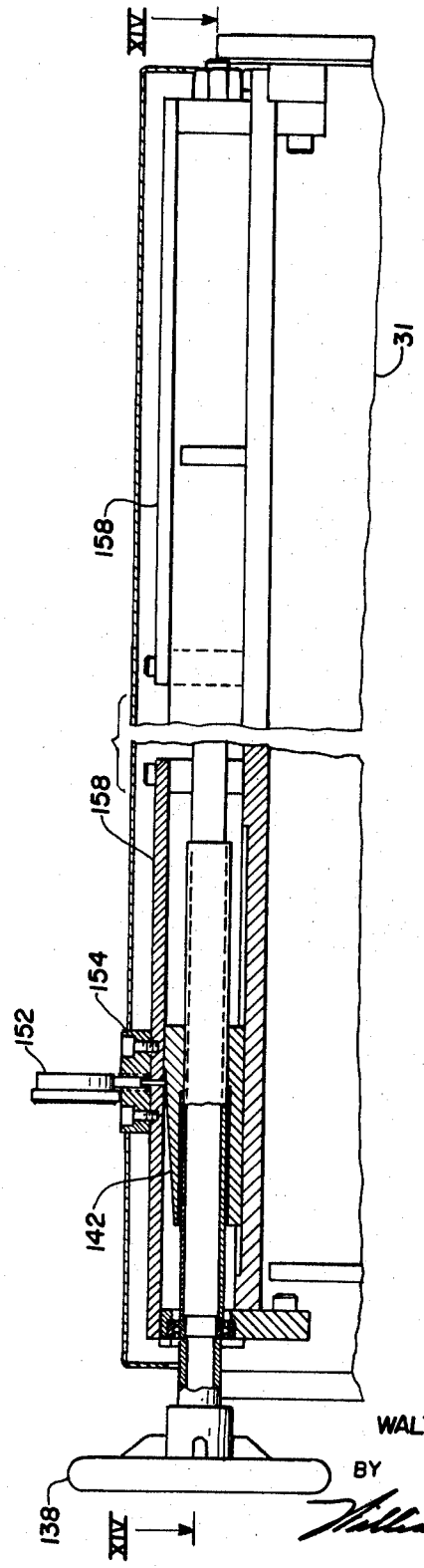

United States Patent Office 3,386,640
Patented June 4, 1968

3,386,640
SHEARING AND WELDING APPARATUS
Walter C. Booher, Butler, Pa., assignor to Voss
Engineering Company, Callery, Pa.
Filed Aug. 25, 1966, Ser. No. 575,152
6 Claims. (Cl. 228—5)

This invention relates to a method and apparatus for joining metal strips or sheets in end-to-end relationship and, more particularly, relates to an improved method and apparatus for shearing and welding said strips while held in abutting relationship, both of which operations are uniquely performed at the same station. This is an improvement of Travillis B. Robinson patent application S.N. 331,709, filed Dec. 19, 1963, assigned to the present assignee.

In the apparatus and method shown in the above identified application, the planisher was cumbersome in certain applications, therefore has been removed from the present apparatus and placed at a subsequent station.

Another disadvantage was that it was very difficult to adjust the steel spring finger suspension to give equal tension, therefore, the springs have been replaced by air tubes in the present invention which provide equal pressure and force throughout.

Suitable means for handling scrap material were not included in the aforesaid structure but are included in the present invention. Likewise, other improvements have been made herein to overcome certain disadvantages of the method and apparatus described in the above-mentioned patent application.

An object of the present invention, therefore, is to provide improvements for overcoming certain disadvantages in application S.N. 331,709.

Other objects and advantages will become more apparent from a study of the following description taken with the accompanying drawings wherein:

FIGS. 2 and 3 are fragmentary, elevational views taken along lines II and III, respectively, of FIG. 1 showing the fingers in the forward and retracted positions, respectively;

FIG. 5 is a cross-sectional view taken along line V—V of FIG. 3;

FIG. 6 is an elevational view of the welding head and assembly;

FIG. 7 is a cross-sectional view taken along line VII—VII of FIG. 6;

FIG. 8 is a side view of a welding head and assembly shown in FIG. 6;

FIG. 9 is an enlarged showing of the chill bar feed of FIGS. 2 and 3 and FIG. 10 is an elevational view of the control therefor;

FIG. 11 is a top view of a structure shown at the right of FIG. 9;

FIG. 12A is an elevational view, partly in cross-section, of the scrap box assembly; FIGS. 12B and 12C are top and side views thereof, respectively;

FIG. 13 shows the finger adjustment positioning control, partly in vertical cross section;

FIG. 14 is a horizontal cross-sectional view of the structure shown in FIG. 13.

Figure 1:
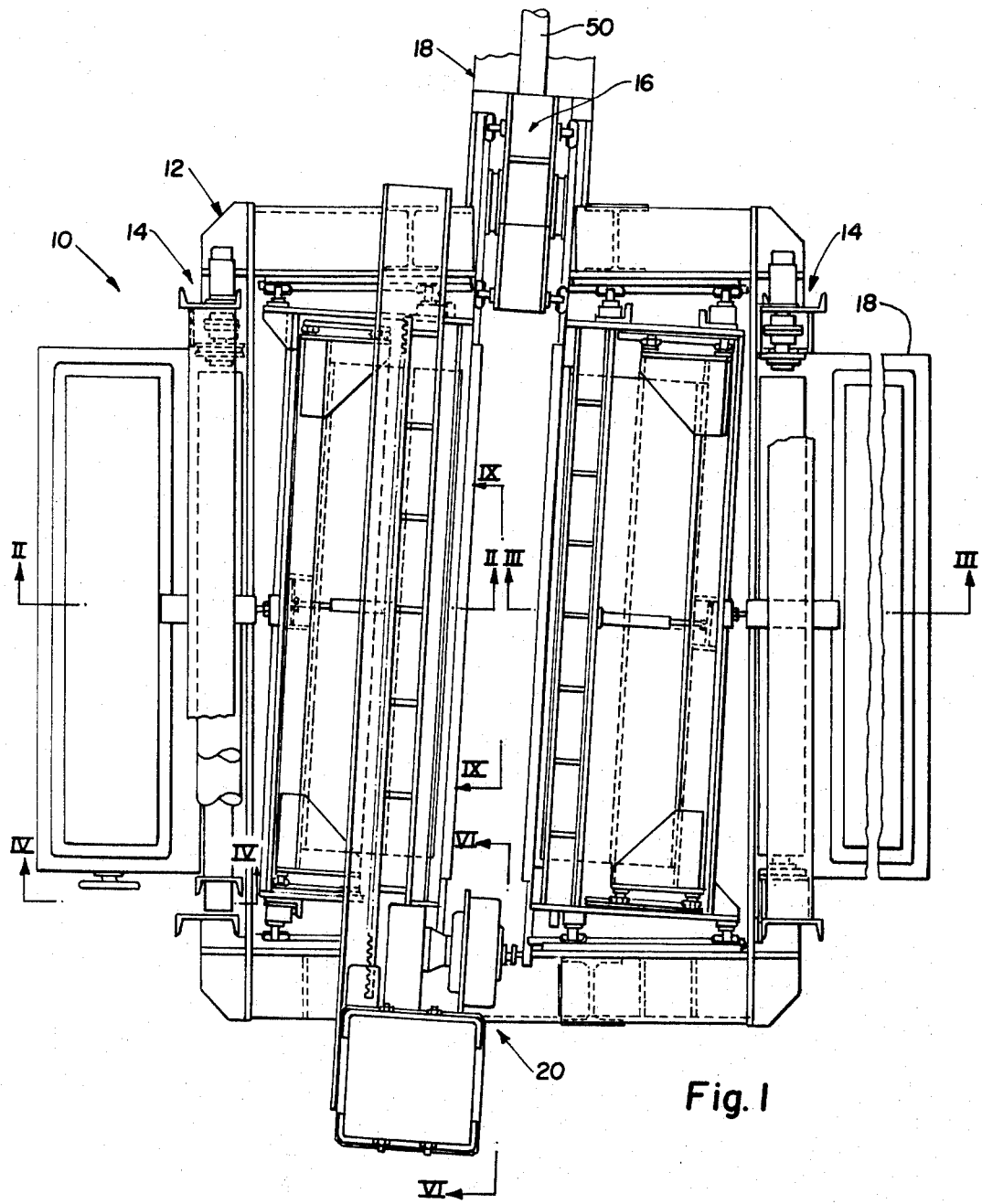
FIG. 1 is a top or plan view of a shearing and welding apparatus at the same station and embodying the principles of the present invention.
Figure 4:
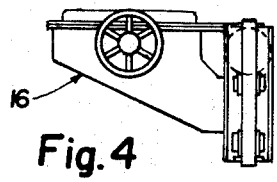
FIG. 4 is an elevational view of the end table, showing the vertical guide rods and hand wheel width adjustment.
Figure 16:
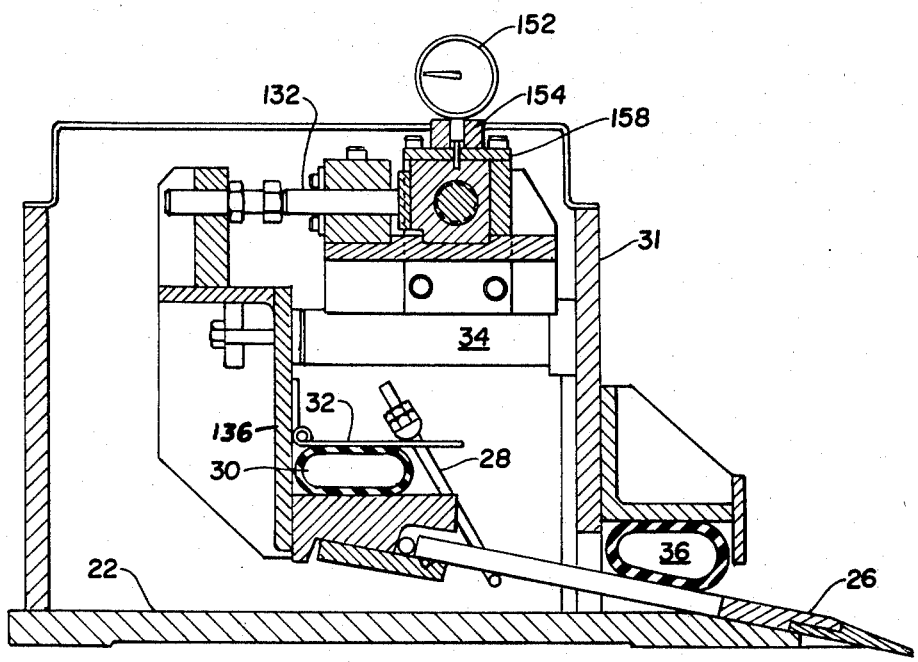

Referring more particularly to FIGS. 1, 2, 3 and 16 of the drawing, clamping of the sheets or strips (not shown) to be welded in end-to-end relationship is accomplished by hydraulic cylinders 24 acting directly against the platens for tightly holding, therebetween, said sheets or strips. Fingers 26 for holding the strips or sheets in proper confronting relationship are held in suspended position by supporting rods 28. Support and backward pull are provided by a rear air tube 30 working through steel hinges 32.

In the prior construction, referred to above, the fingers were held in suspended position by steel springs, however, such arrangement is not entirely satisfactory because the springs cannot be adjusted to give equal force throughout the width of the sheets or strips. With the air tube 30 in the present invention, equal force can be maintained at all times.

The finger assembly is moved forwardly by a small hydraulic cylinder 34. Then finger clamping pressure on the strip is applied by air pressure through forward air tube 36.

Shear 16 is very similar to the prior, aforementioned shear in application Ser. No. 331,709. However, the present invention provides for scrap removal which is accomplished by a unique "drop-out" type scrap box 40 mounted on the back of the shear, as best shown in FIGS. 12A, 12B and 12C. The scrap box 40 is equipped with a hinged, spring-loaded bottom door 42. The door is opened by a mechanical trip 44, when the shear is in the back position. When the shear is moving, spring force holds the scrap box door closed. The shear 16 is driven by a hydraulic cylinder 50. As the shear moves across the strip ends, sheared scrap passes through the shear head and is deposited in the closed scrap box 40. Scrap box 40 then allows scrap to drop out into the scrap bin after the shear moves back to the rest position.

FIGS. 6, 7 and 8 show the welding unit mounting and weld head assembly. When weld head 56 is in the rest position, it is back away from the shear travel area. Therefore, vertical retraction of the weld head is only 1½". Weld head 56 is normally held in the "up" position by steel spring 58. To weld, the weld head 56 moves horizontally over the edge of the strip. A small hydraulic cylinder 60 moves moves the weld head 56 down about 1½" to the weld surface. The weld head 56 then moves across the strip to the far edge. Hydraulic pressure is exhausted from cylinder 60. Spring 58 then lifts weld head 56 back to the "up" position. Weld head 56 moves back to the original rest position. Weld head 56 and wire spool 62 are mounted on a common bracket 64. This keeps wire feed tube 66 from bending excessively which may cause wire feed troubles.

FIGS. 9, 10 and 11 show the chill bar feed including two hydraulic cylinders 68 which lift side arms 70 into weld position shown in dash and dot outline. Side arms 70 pivot on shoulder bolts. Two chill bars 72 are seated in the chill bar cradle 74. Horizontal slots 75 on the lower platens, align the chill bar cradle 74 when the platens move into weld position.

For selecting a chill bar, the chill bar cradle 74 must be in the retracted position. Then removable handle 76 is placed over the end of turn rod 78, which is fastened to chill bar cradle 74. The square hole in handle 76 matches the square end on turn rod 78. Handle 76 is thrust further onto rod 78, compressing spring 80 and moving drift pin 82 into hole 86 located in side arm 70. Drift pin 82 compresses detent 88, releasing the chill bar cradle 74 from side arms 70. Handle 76 is then rotated 180° and detent 92 is compressed against the angular face on side arm 70 during 180° rotation. At the completion of 180° rotation, detent 92 snaps into place in hole 86 when handle 76 is pulled back to retract drift pin 82, thus securing the chill bar cradle with a new chill bar for welding. Handle 76 is then removed from turn rod 78 and allowed to hang at the side of the machine by chain 98.

Two chill bar feed units are built into one machine when it is necessary to have three or four different chill bars for various welding operations. In this case, another chill bar feed unit is mounted upon the opposite lower platen. Operation is the same as for the original chill bar feed unit. Selection is made electrically by the operator for either chill bar feed unit. When only one chill bar is used, mechanical or electrical selection is not needed.

Figure 15:
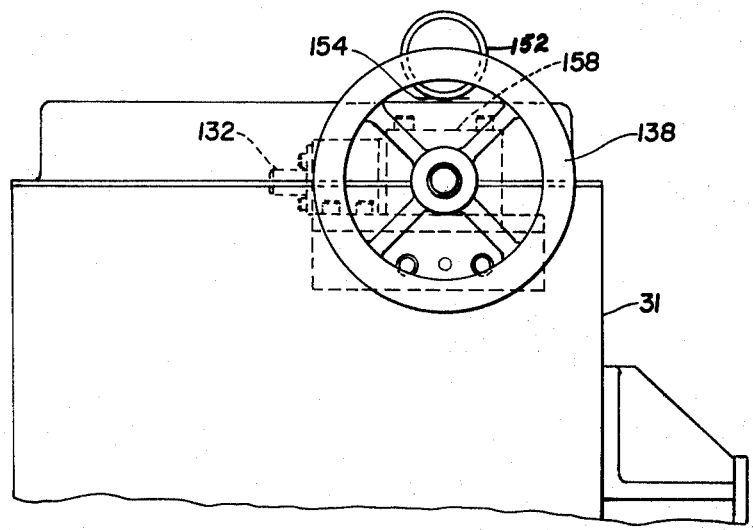
FIGS. 15 and 16 show the means for controlling movements of the fingers.

The finger adjustment positioning control shown in FIGS. 13–16 operates as follows:

Upper platen 31 supports the positioning control unit comprising parts 132, 142, 144, 150, 152, 154, 158 etc. Finger mechanism 136, located inside upper platen frame 31, when moved forward into weld position, rests against stops 132. These stops are adjustable in the following manner: rotating handwheel 138, rotates shaft 140 which has a right hand and left hand thread. Mounted on each thread is a brass block, 142 and 144 respectively, with a taper on one side. As shaft 140 is rotated one direction, blocks 142 and 144 move toward each other. When shaft 140 is rotated in the opposite direction, blocks 142 and 144 move away from each other. End stops 132, mounted in support blocks 148, are held against brass blocks 142 and 144 by springs 150. As brass blocks 142 and 144 move longitudinally along shaft 140, stops 132 move at right angles to the brass block movement due to the taper of brass blocks 142 and 144. Movement of the stops in this manner changes the weld position of the finger mechanism 136. Dial indicator 152 mounted in support block 154 has its pusher rod riding against a tapered groove in block 142. This tapered groove has the same slope as the taper that the stops 132 ride against.

Threaded nuts 156 bolted against brass blocks 142 and 144 eliminate backlash. Brass blocks 142 and 144 are held in a non-rotating position by cover plates 158 while still allowing them to move linearly.

While a planishing device such as shown in the aforesaid earlier patent application may be used in the above described invention, it is preferred, instead, to rely upon a planisher at a different and subsequent station so as to planish the welded joint while strip is moving along the line of strip travel.

Thus it will be seen that I have provided an efficient apparatus for shearing and welding sheet or strip material while such material is moving continuously in a line and constituting an improvement over the apparatus shown in the aforesaid patent application S.N. 331,709; more specifically, I have provided improvements in the means for controlling the pressure of the fingers for holding the strips or sheets in confronting relationship, comprising an air tube working through hinges to insure equal force on all fingers throughout the width of the sheet or strip; furthermore, I have provided a scrap box assembly to insure easy and quick disposal to scrap resulting from shearing operations; furthermore, I have provided improved means for selecting a chill bar and for moving it quickly and accurately in place; furthermore, I have provided shearing and welding of strips or sheets while held in contacting or confronting relationship at a single station and involving fingers that serve a dual purpose only during the welding sequence, namely (1) they clamp down on both edges of the "butted together strip" keeping the edges solidly against the bottom chill bar and thus reducing to a minimum any "wrinkling" of the strip edges that could occur; (2) they act as heat sinks, conducting away from the weld any excessive heat that might tend to burn out the weld.

The planisher disclosed in the aforesaid application Ser. No. 331,709 is not shown herein since it is not necessary that it be located at the same station, but may be located at a subsequent station. If a planisher is desired, it may be substituted for the exit pinch rolls at the same station or at a subsequent station, since it performs the same retarding operation as the replaced pinch rolls.

While I have illustrated and described a single specific embodiment of my invention, it will be understood that this is by way of illustration only, and that various changes and modifications may be made within the contemplation of my invention and within the scope of the following claims.

I claim:

1. Apparatus for shearing and welding metal strips together in end-to-end relationship while the strips are temporarily stopped in their movement along a line, comprising a plurality of fingers disposed in spaced relationship along the widths of the end portions of the strips to be sheared and welded, rod means for pivotally lifting said fingers, hinge means for supporting the top end portions of said rod means, and a pneumatic tube in contacting relationship underneath said hinge means, whereby when air under pressure is introduced in said tube, the tube will lift the hinge means and rod means so as to lift the fingers from clamping engagement with the strips.

2. Apparatus as recited in claim 1 together with a frame in which said fingers are supported, power operated means for horizontally moving said fingers into and out of said frame, and a second pneumatic tube confined between a portion of said frame and the top surfaces of said fingers, whereby when air under pressure is introduced in the tube, the fingers will be moved forcibly down against said strips with uniform pressure on all fingers.

3. Apparatus as recited in claim 2 together with adjustable stop means for limiting movement of said fingers outwardly of said frame.

4. Apparatus as recited in claim 1 together with clamping means for holding together the ends of said strips, and chill bar means for supporting the bottom surfaces of said ends, comprising a cradle element having inset chill bars on opposite sides thereof, lower platens which are hydraulically moved together and apart, said platens having slots movable to horizontal confronting relationship to serve as pockets for receiving horizontally projecting portions of said cradle extending at right angles to said chill bars.

5. Apparatus as recited in claim 4 together with turn rod means for selecting and mounting said chill bars on the cradle when in retracted position.

6. Apparatus as recited in claim 4 together with shearing means, a scrap box associated with said shearing means, said scrap box including a hinged, spring-loaded bottom door, and a mechanical trip for opening said door when the shearing means is moved to the retracted position, said spring-loaded door being held closed when the shearing means is moving.

References Cited

UNITED STATES PATENTS

| | | | |
|---|---|---|---|
| 3,307,764 | 3/1967 | Robinson | 228—5 |
| 3,131,663 | 5/1964 | Lawson | 228—5 |

RICHARD H. EANES, Jr., *Primary Examiner.*